(12) United States Patent
Hassan et al.

(10) Patent No.: US 7,761,607 B2
(45) Date of Patent: Jul. 20, 2010

(54) USER BASED COMMUNICATION MODE SELECTION ON A DEVICE CAPABLE OF CARRYING OUT NETWORK COMMUNICATIONS

(75) Inventors: Amer Hassan, Kirkland, WA (US); Pradeep Bahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1267 days.

(21) Appl. No.: 10/831,058

(22) Filed: Apr. 23, 2004

(65) Prior Publication Data

US 2005/0238046 A1 Oct. 27, 2005

(51) Int. Cl.
G06F 15/177 (2006.01)
G06F 15/16 (2006.01)
G06F 3/00 (2006.01)
H04J 3/16 (2006.01)
H04J 3/22 (2006.01)

(52) U.S. Cl. .............. 709/250; 709/220; 709/221; 709/222; 709/227; 709/228; 709/229; 715/733; 715/734; 715/735; 715/736; 715/737; 715/738; 715/739; 715/744; 370/465

(58) Field of Classification Search .......... 709/250, 709/220–222, 227–229; 715/733–739, 744
See application file for complete search history.

(56) References Cited

U.S. PATENT DOCUMENTS

| | | | | |
|---|---|---|---|---|
| 5,930,259 | A * | 7/1999 | Katsube et al. | 370/409 |
| 6,192,414 | B1 * | 2/2001 | Horn | 709/239 |
| 6,272,532 | B1 * | 8/2001 | Feinleib | 709/206 |
| 6,965,948 | B1 * | 11/2005 | Eneborg et al. | 709/250 |
| 2002/0176366 | A1 * | 11/2002 | Ayyagari et al. | 370/245 |
| 2003/0065784 | A1 * | 4/2003 | Herrod | 709/227 |
| 2004/0205158 | A1 * | 10/2004 | Hsu | 709/218 |

OTHER PUBLICATIONS

Kim et al.; "Selective Channel Scanning for Fast Handoff in Wireless LAN using Neighbor Graph"; The 2004 International Technical Conference on Circuits/Systems, Computers and Communications; Japan Jul. 6-8, 2004.*
U.S. Appl. No. 10/693,655, filed Oct. 24, 2003, Krantz et al.

(Continued)

Primary Examiner—Vivek Srivastava
Assistant Examiner—Lin Liu
(74) Attorney, Agent, or Firm—Wolf, Greenfield & Sacks, P.C.

(57) ABSTRACT

An application program is disclosed for execution on a computing device capable of supporting network communications via multiple differing communication modes. The application includes a set of user interface elements facilitating easy user selection of one of a set of communication modes supported by the computing device. Thereafter, the selected communication mode is utilized to support communications for the application. The application program also includes an interface to a transport layer component. The interface initiates binding a network interface to an endpoint opened by the application in accordance with the designation of the communication mode. Furthermore, the interface passes transmission requests to the interface identifying the endpoint. Therefore the interface facilitates forcing use of the designated network interface to complete the transmission requests of the application.

36 Claims, 9 Drawing Sheets

OTHER PUBLICATIONS

U.S. Appl. No. 10/724,843, filed Dec. 1, 2003, Bhanu et al.
U.S. Appl. No. 09/805,500, filed Nov. 28, 2002, Ayyagari et al.
U.S. Appl. No. 10/723,673, filed Nov. 26, 2003, Wolman.
Request for Comments: 1122, Requirements for Internet Hosts-Communications Layers. Table of Contents (pp. 1-4) and Section 3.3.4: Local Multihoming (pp. 60-64). Dated Oct. 1989, http://www.faqs.org/fttp/rfc/pdf/rfc1122.txt.pdf.

* cited by examiner

USER BASED COMMUNICATION MODE SELECTION ON A DEVICE CAPABLE OF CARRYING OUT NETWORK COMMUNICATIONS

FIELD OF THE INVENTION

This invention generally relates to the area of computer systems. More particularly, the present invention concerns methods and systems for selecting, configuring, and/or controlling wireless network communications on computing devices. Even more particularly the present invention is directed to methods and user interfaces facilitating associating one or more applications with particular ones of multiple network interfaces supported by a single computing device.

BACKGROUND OF THE INVENTION

Today, a variety of networking technologies support network connectivity. In the past, users were generally exposed to a limited number of network connectivity choices. In most cases the choices involved wired LAN (e.g., Ethernet) and wired WAN (e.g., public switched telephone network dial-up/modem) connections. However, more recently wireless connectivity has become popular and are becoming pervasive. Wireless wide area network (WWAN) technologies, such as those embodying the GPRS, WCDMA, WiMAX (802.16), etc. protocols, enable computing devices to connect to remote computer networks via cellular data transmission networks. Wireless local area network (WLAN) technologies, such as those incorporating the IEEE 802.11 a/b/g, HomeRF, ETSI Hiperlan/2, etc. standards enable users to access local area network resources via wireless access points/transceivers. Wireless personal area network (WPAN) technologies, such as those using Ultra Wideband (UWB) communications, and Bluetooth, represent yet another wireless technology incorporated within computers today. There are other technologies that fall in the realm of data control such as Zigbee and RFID. Network connectivity for a particular computing device may differ in other aspects. For instance, a device may experience different types of connectivity to two different networks through a same wireless technology. A first network supports connectivity through an infrastructure supported by fixed access points, while a second network provides ad-hoc connectivity such as through mesh networking.

Furthermore, many computers are now equipped with network interface hardware and software supporting connectivity to multiple ones of the above-mentioned wired/wireless network technologies. Depending upon configuration and proximity to wireless network transceivers and/or wired network outlets, a computing device is capable of using any of the multiple network interfaces/networks associated with one or more of the above-identified networking media technologies. Simultaneous availability/existence of wireless communication technologies and their associated wireless signal transmissions arise, for example, within an office environment that supports wired/wireless local area network, wired/wireless wide area network, and personal area network connectivity. The presence of multiple simultaneous networking technology options enhances flexibility with regard to how a computing device connects to networks and/or resources (including computer peripherals such as speakers, a keyboard, a mouse, etc.).

The abundance of network connectivity choices facilitates a vast new array of options to computer users for accessing network resources. In many cases, selecting a particular interface is best left to automated network interface selection processes preconfigured and applied by network connectivity management services executed within the computer system. For example, applications, when launched, establish any required network connection using a default network interface. In more advanced wireless network interface/network selection arrangements, a simple selection rule (e.g., choose the fastest available network) facilitates selecting between two or more available network connection technologies (e.g., 802.11a and 802.11b both of which are commonly known as Wi-Fi technologies). More particularly, network interface/network selection involving Wi-Fi technology is based upon an SSID (identity of a wireless network—facilitating determination of connectivity to particular resources such as the Internet) and maximum supported network connection speed. Under this relatively simple criterion, if two differing wireless technologies offer connectivity to a same network/resource, then the faster wireless technology is selected.

In a world where users expect/value/demand computing systems that support intuitive learning—as opposed to reading a manual—the automated selection mechanisms render network interface decision-making substantially transparent to users. Network selection transparency enables relatively inexperienced users to connect in what is, in most cases, the best way under current network availability circumstances. However, such automated network interface selection mechanisms are not suited for all users, and in such cases users of computing devices may choose to utilize non-automated network interface/network selection mechanisms such as connection/dialup manager services or the use of tools to manipulate the priorities associated with the network interfaces.

SUMMARY OF THE INVENTION

The present invention comprises a method and user interface-based mechanism enabling users to easily select network communication modes (e.g., interface technologies/networks) for a particular task, session, application, message, etc. through a user interface exposed, for example, by an application. The application subsequently utilizes the selected network communication mode.

In accordance with an inventive aspect, an application program is executable upon a computing device capable of supporting network communications via multiple differing communication modes. The application, in order to facilitate easy user selection of particular communication modes supported by the computing device, includes a set of user interface elements that facilitate designating, by the user, a communication mode, of the set of supported communication modes. Thereafter, the selected communication mode is utilized to support communications for the application. The selection persists, in particular embodiments of the invention, in the context of the application on a task, session, message, etc. basis.

The application program also includes an interface to a transport layer component. The interface initiates binding a network interface to an endpoint opened by the application in accordance with the designation of the communication mode. Furthermore, the interface passes transmission requests to the interface identifying the endpoint. Therefore the interface facilitates forcing use of the designated network interface to complete the transmission requests of the application.

In accordance with other inventive aspects a method and computer readable media embody the functionality of the above-described application including user interface elements for selecting a particular communication mode.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
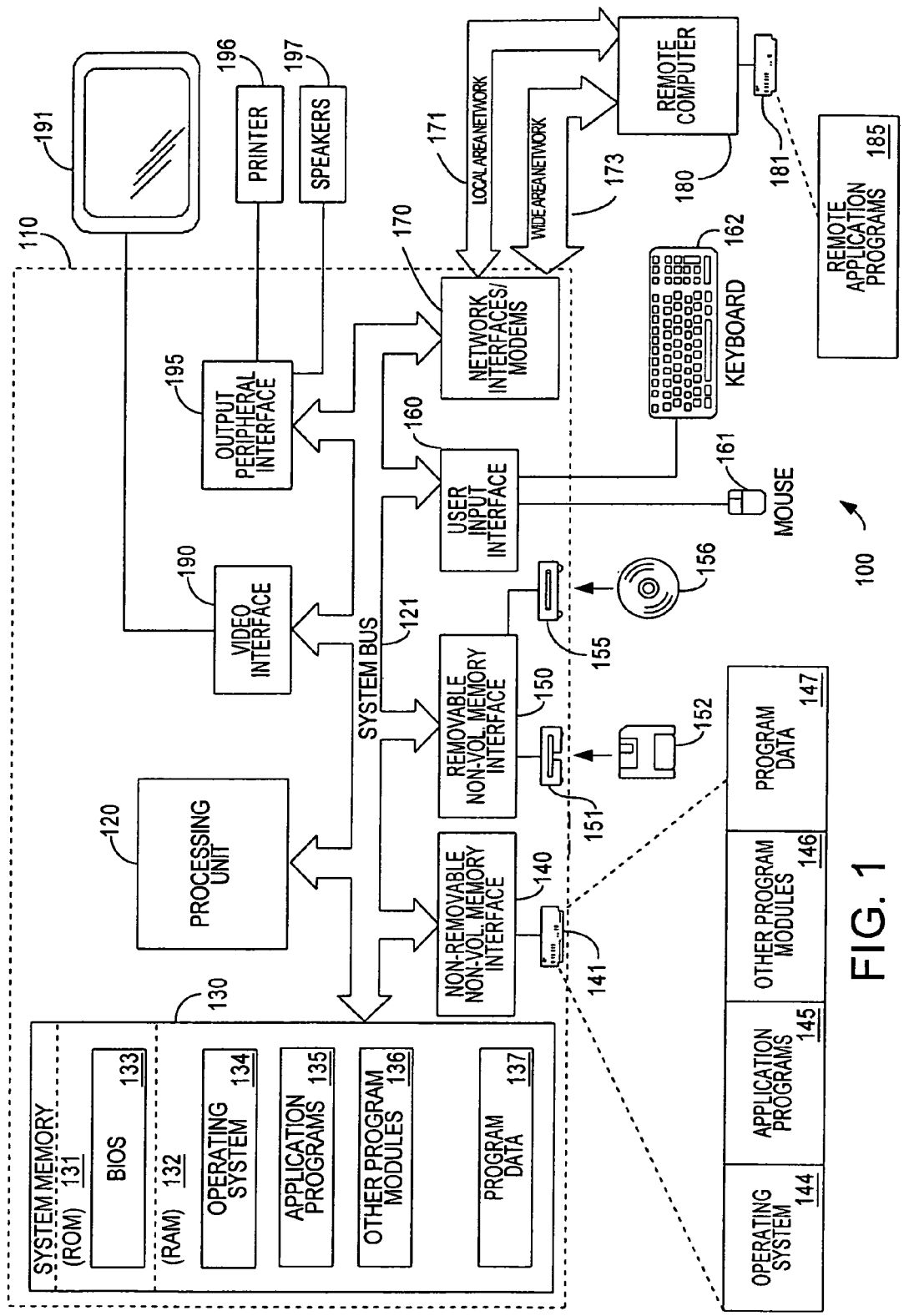
FIG. 1 is a simplified schematic illustrating an exemplary architecture of a computing device for carrying out an embodiment of the present invention.

An illustrative network communication mode (e.g., network interface and network combination) configuration/control mechanism and user interface elements are disclosed herein that enable designating, through an application program's user interface, a particular communication mode for carrying out communications associated with the application to suit particular network communication purposes, requirements, and needs that arise over the course of running the application program. Thereafter, the application enforces a strong host model when submitting transmission requests. In accordance with the strong host model, if a particular network interface (and network—identified by a network identifier) has been designated for a connection, then network communication requests issued by the particular application are bound to the particular interface and provider/network associated with the connection. The strong host model is potentially useful in situations where an application executes on a computer system capable of accessing a network resource via multiple network interfaces, networks and/or network providers (e.g., multiple wireless network providers, each provider potentially supplying access to one or more networks). The particular network communication mode is designated via a user interface (UI) presented by an application. This portion of the application's UI is designed to be a user friendly listing of networking options for the user.

The application includes functionality for designating, within the context of the application, a communication mode (e.g., interface and network combination) to which subsequent communications will be bound and carried out by transport and network access components of a computing device upon which the application executes. In embodiments described herein below, an application presents icons representing various modes of communication selectable by a user. However, embodiments of the invention are contemplated wherein automated selection mechanisms are applied to connection selections made on behalf, and in the context, of a particular application. For example, an automated interface/network selection mechanism potentially specifies using different modes of network communication (e.g., different wireless communication technologies such as 802.11x, GPRS, Bluetooth, UWB, etc.) based upon a specified purpose or designated communication requirements.

The present invention contemplates a variety of ways for persisting a selection of a mode of communication (e.g., a particular provider/network accessed via a network interface) enforced by an application program on subsequent transmissions. Since the reason for selecting a particular mode of communication can exist for differing measures of time (a transaction, a session, etc.), the persistence of a previously selected mode of communication potentially differs. Selections, whether provided manually or automatically, persist on, for example, per message, transaction, session (e.g., a logged-on user context), or application instance bases. During the period of persistence, if a particular communication mode has been designated, then network communications for the particular application are bound to a particular network interface in accordance with the strong host model. Embodiments of the present invention contemplate a variety of persistence levels/durations/criteria for a mode of communication established for a particular application or user.

The present invention is applicable to a variety of application programs that require, during the course of their operation, a network connection to access a network resource. Email and Internet browser application examples are specifically addressed herein below. However, the present invention includes virtually any application wherein a particular communication technology/network provider (or network accessed via a provider capable of supplying access to multiple networks) is desired based upon a particular purpose (e.g., personal use, high bandwidth).

Thus, in summary, the mechanism and associated user interface elements, described by way of example herein, provide a way for a user (either manually or through a pre-defined selection criterion applied on behalf of an executing application program or user session) to select a communication mode on a per transaction, session, application, and/or user basis within the scope and operation of one or more applications depending upon whether the communication mode was designated within the context of an application or a logged-on user. Thereafter, the application (or applications) enforce the selection according to the above-described strong host model for carrying out network requests.

FIG. 1 illustratively depicts an example of a suitable operating environment 100 for a computing device (e.g., a notebook computer) used in an environment supported by multiple networks accessed via various differing wired/wireless communication technologies. The operating environment 100 is only one example of a suitable operating environment, and is not intended to suggest any limitation as to the scope of use or functionality of the invention. Other well known computing systems, environments, and/or configurations that may be suitable for use with the invention include, but are not limited to, personal computers, server computers, laptop/portable computing devices, multiprocessor systems, microprocessor-based systems, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media such as wireless PAN, wireless LAN and wireless WAN media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through one or more wired/wireless network interfaces 170. Furthermore, the set of one or more wired/wireless network interfaces 170 support communications over the WAN 173, such as the Internet. While not shown in FIG. 1, computer 110 potentially includes an internal or external modem, connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The present invention is potentially incorporated into both mobile and non-mobile computing devices/machines used in a variety of dynamic networking environments and executing a variety of tasks. In such environments, the availability of certain network interface technologies, networks and/or network service providers can change. This in turn potentially affects quality of service or other factors that a user considers when selecting a network interface/network for carrying out a particular task or tasks associated with running a particular application. The user-driven network interface/network selection mechanism and application user interface elements embodying the present invention facilitate establishing a connection using a particular communication mode (e.g., via a particular network interface/network)—taking into consideration that the user's connectivity needs can potentially differ based upon the application and the environment (e.g., home, work, customer site, competitor headquarters, airport, etc.) within which the user is operating the application. Furthermore, wireless connectivity is subject to varying channel conditions that can cause a link to break (outage in the terminology of wireless access) for seconds. In accordance with particular embodiments of the invention, the user is notified when a previous communication mode selection becomes unavailable during the session, rather than having the (for instance) computing device automatically switch to another available connection.

Figure 2:
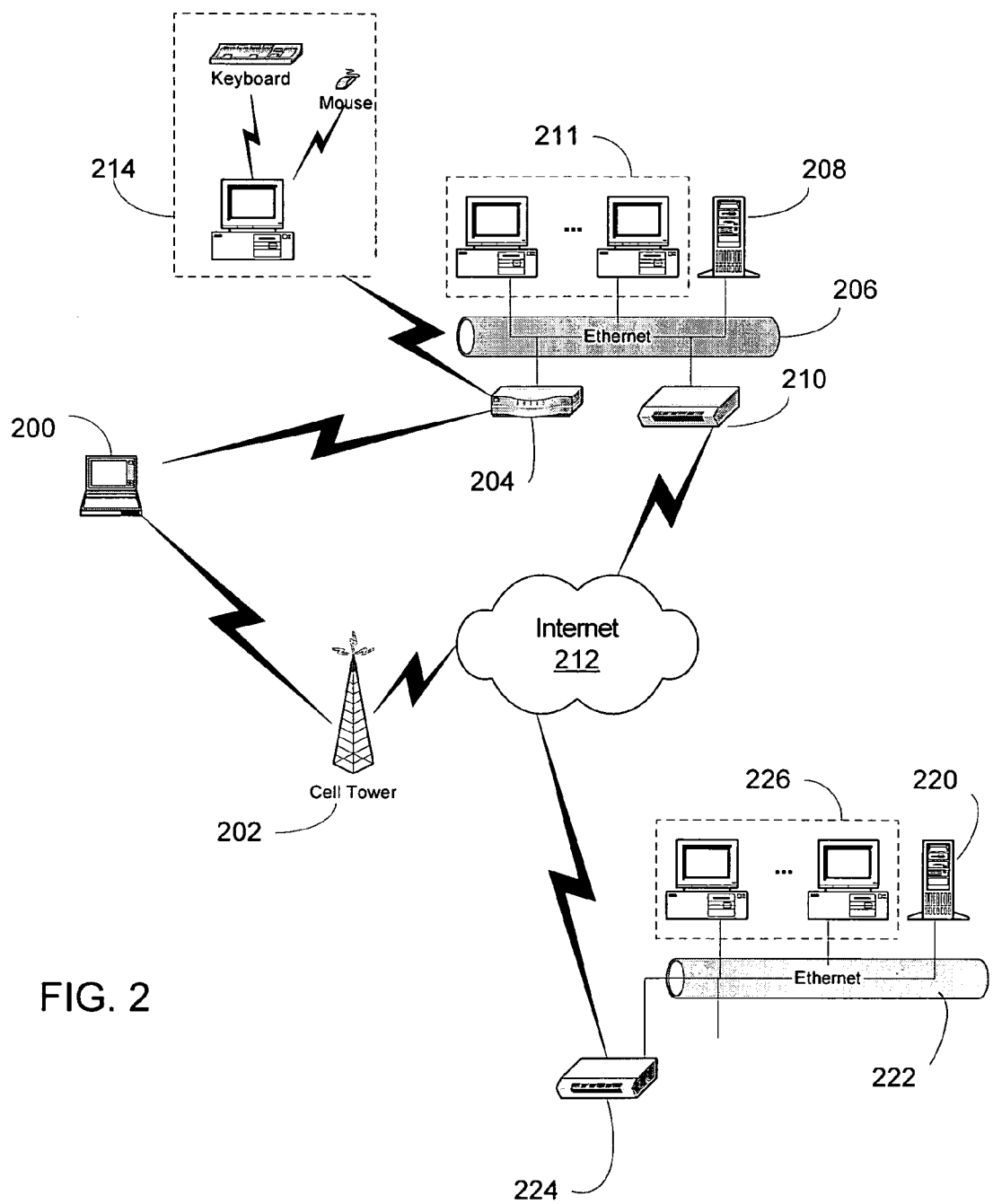
FIG. 2 is an exemplary multiple network communication interface arrangement including multiple physical communication infrastructures for meeting network connectivity requirements of a computing device user.

Turning to FIG. 2, a simple example of a network computing environment is depicted wherein the invention is potentially exploited. In the illustrative environment, a notebook computer 200 includes multiple network interface cards (not specifically shown) facilitating communications via multiple network interface technologies. In the particular example depicted in FIG. 2, the notebook computer 200 potentially communicates with a cellular transmission tower 202 (via a WWAN wireless technology such as GPRS) and a wireless transceiver 204 (via 802.11a/b/g media rules/protocols) that is communicatively coupled to a local area network 206.

The wireless transceiver 204 (also referred to as a wireless access point, or WAP), provides access to a variety of resources on the LAN 206. For example, the wireless transceiver 204 provides access by the notebook computer 200 to directories maintained on a file server 208. The LAN 206 also contains a gateway/firewall/modem 210 providing access, by users of computing devices connected to the LAN 206 (including a set of computers 211 and the user of the notebook computer 200), to the Internet 212. The gateway/firewall/modem 210 also provides access by users of the Internet 212 to resources on the LAN 206.

The user of the notebook computer 200, as a result of the multiple supported network media, is able to access the Internet 212 and the file server 208 (through the Internet 212) via multiple communication media. For example, utilizing a WWAN network interface, the notebook computer 200 is able to access the Internet 212 via a cellular network including the cellular transmission tower 202. Alternatively, the notebook computer 200 accesses resources on the LAN 206 via the wireless transceiver 204. The LAN 206 in the illustrative example is assumed to include network access and proxy servers that enable a properly authenticated user of the notebook computer 200 to access resources of the Internet 212 and the LAN 206 via either of the two illustratively depicted wireless network media.

The user of the notebook computer 200, in the illustrative network environment, accesses an email server 220 attached to a LAN 222 (e.g., a user's home corporate network). Access is achieved via a gateway/firewall/modem 224 connected to the Internet 212. A set of computers 226 are connected to the LAN 222 via hardwired network interfaces. It is noted that the user of the notebook computer 200 is potentially capable of accessing an email account maintained by the email server 220 through either LAN 206 (via the wireless transceiver 204) or the WWAN route through the cellular transmission tower 202 since both routes both offer connectivity to the Internet 212. The availability of multiple access routes and interface technologies for accessing a particular remote resource introduces the potential for selection of a particular one of the network interfaces/networks based upon current conditions, needs, preferences, etc. of the user and particular application running on the notebook computer 200. A number of scenarios involving such multiple access routes are presented herein below.

Scenario #1—Personal Use Versus Corporate Use

A user of a computer, such as the notebook computer 200, is at work and connected to the corporate intranet. During a lunch break, the user would like to use a personal email account maintained by an external email service provider to send a personal message. Alternatively, the user wishes to use an http service to access personal information, and an appropriate http service is accessible through a proxy server. However, company policy prohibits employees from using the company's network resources for personal uses. Under these circumstances, the user must ensure that the corporate intranet is used for business matters only, and personal tasks are performed using non-corporate networking assets.

Scenario #2—Enhanced Security

An employee from Company A is visiting a competing Company B. Company B provides a guest network based on Wi-Fi technology that provides access to the Internet. However, the employee of Company A, concerned about loss of confidentiality when reading email or downloading files from Company A (notwithstanding their encryption) seeks a further degree of isolation from Company B's networking/computing facilities. In this case, the employee of Company A routes communications, between his email application and the email server, via a public GPRS connection supported by a wireless WAN network interface on the employee's laptop computer. Thus, no sensitive information passes through the networking infrastructure of Company B.

Scenario #3—Congested Network Avoidance

A computer scientist is at a professional organization meeting. While there, the scientist uses a Wi-Fi connection to download files from a local server. Other attendees are doing the same—resulting in an overloaded access point on the Wi-Fi network. The scientist, switches to a UMTS connection resulting in superior access speed for web browsing and A/V streaming. Using the alternative network interface technology not only enhances the user's experience, it also helps reduce the load on the congested network. It is noted that, under automated network interface selection criteria, the Wi-Fi network, because of its higher maximum speed, would have been selected by the computer. In such cases, a user interface-based manual network interface selection mechanism enables the user to override a less desirable (under the circumstances) automated selection.

In each of the above-described scenarios involving a choice/need to access a network resource via a particular one of multiple available network interfaces/networks, the application user interface-based network interface/network selection mechanism embodying the present invention enables a user to select a network interface technology/network, and persist the selection, on a per transaction, session, application, or user instance basis for a variety of applications that utilize a network connection. Such applications include email, browser, music/movie media players, etc. Users can designate filters to allow particular size transactions of an application go through particular connections, or all transactions on a particular application go through a particular technology/network.

Furthermore, a computing system potentially supports a user setting up global communication mode preferences that are then applied to all applications executed under the user's context. Such preferences are specified, by way of example, through a management UI tool (as opposed to a particular application UI). Thereafter applications running under the user's context receive notification of the previously designated preferences. Thus, in accordance with particular embodiments of communication mode designation facilities, a generalized system-wide management UI is provided for designating communication mode preferences for all applications executing under a particular user context, rather than limiting user-specified communication mode preferences to a particular application that supplies a user interface facilitating designating such preferences.

In the set of exemplary application user interfaces provided herein below with reference to FIGS. 3, 4 and 5, an email application (e.g., MICROSOFT OUTLOOK) is utilized to describe an exemplary embodiment of the present invention. However, as mentioned above, the present invention is incorporated into a variety of applications that rely upon network communications at some point during their operation. Thus, the scope and applicability of the present invention should not be confined to the exemplary email application.

Figure 3:
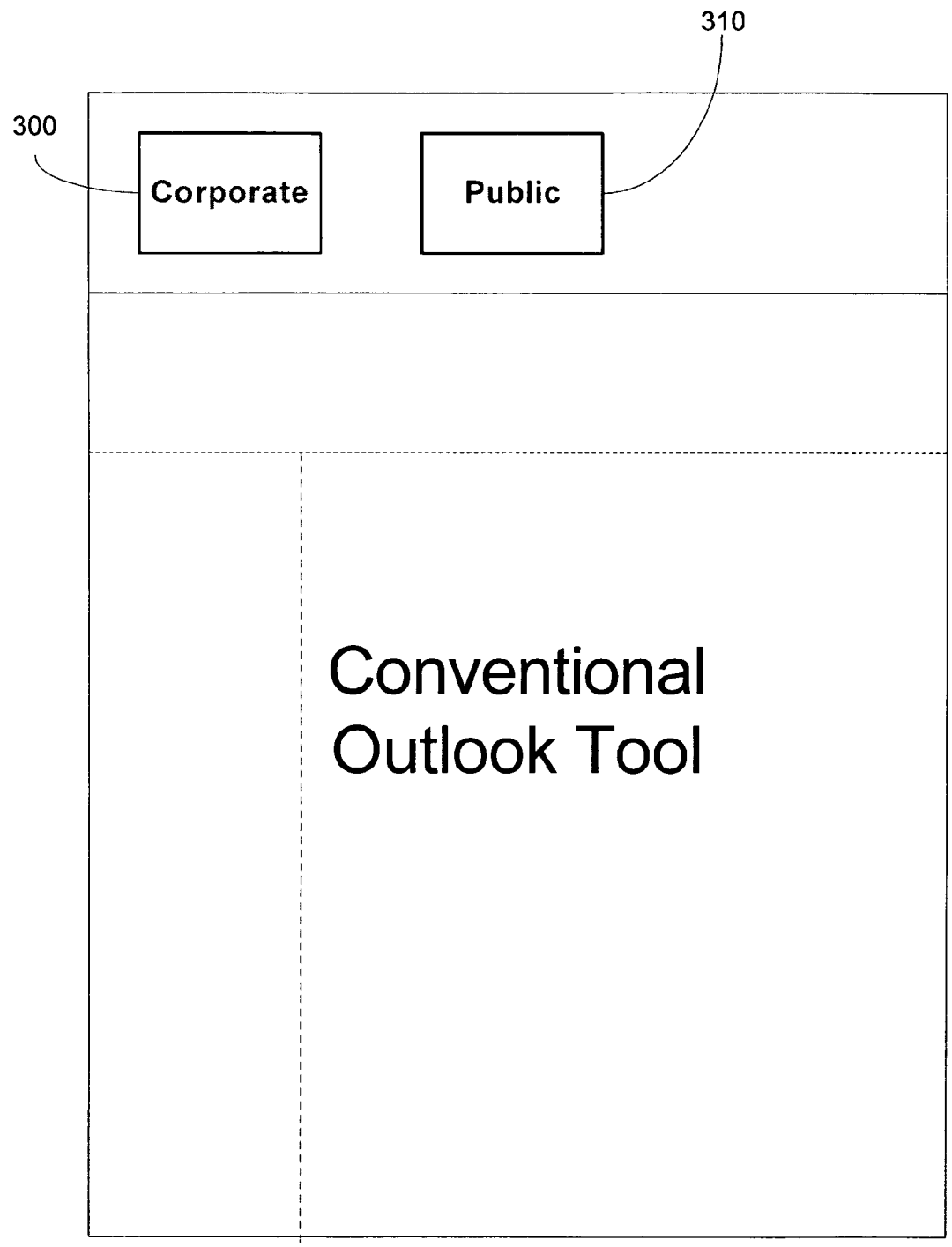
FIG. 3 provides an exemplary application user interface exposing a set of selectable network connections.

Turning to FIG. 3, an exemplary email application user interface for selecting a network interface/technology for carrying out a network communication for the email application program is schematically depicted. In this example, the email application exposes potential communication modes (e.g., network interface type and network combinations) in the form of icons corresponding to available network interfaces/networks. However, in alternative embodiments, such network interface selection user interface is presented after a user selects an icon, button, menu option, for launching a network interface/network selection dialog/interface.

With continued reference to FIG. 3, a skeletal view of an email (e.g., MICROSOFT OUTLOOK) application user interface includes a corporate connection type icon 300 and public connection icon 310. When either of the presented connection type icons 300 or 310 is selected, the computer running the email application commences sending/retrieving an email message via the designated network interface/network service provider/network corresponding to the icon. The arrangement depicted in FIG. 3 for selecting a communication mode addresses scenario #1 above—a corporate user at the corporate premises.

It is further noted that the communication mode selection icons have intuitive, descriptive labels. Rather than merely identifying a network interface by its IP address or protocol (e.g., 802.11a, 802.11b, GPRS, etc.), which have little meaning to a substantial portion of users, an embodiment of the present invention supports designating descriptive tags such as "corporate" and "public." The descriptive tags potentially highlight primary distinctions between the available network interfaces/networks presently available to a user. For example, in the above described scenario #1 the user selects the corporate connection type icon 300 for business email and the public connection type icon 310 for personal email. Similar icons/buttons can be used for applications that facilitate file transfers and access to the Internet via communication modes supported by the computing device upon which the applications execute. Alternative descriptive terms address any one or more of a variety of network interface/network selection factors including, for example: cost, security, speed, etc.

Furthermore, in an embodiment of the invention the buttons/icons representing available communication modes (also referred to herein as network interface/network combinations) are color coded. For example, the color green identifies a default communication mode, while a blue icon indicates a live, non-default communication mode. In an embodiment of the invention, a user designates a non-default communication mode by selecting a corresponding icon (e.g., the public connection icon 310). Furthermore, to change the status of a non-default communication mode to default status, the user right clicks on an icon associated with the communication mode to launch a menu including a "set as default" communication mode option. Selecting the "set as default" option changes the status of the selected communication mode (or any general selection within a connection selection tree described herein below) to default status.

While the present invention potentially shields users from information associated with available network interfaces and networks with which a user may connect, the user is still provided access to such information. The data structures maintained by the email application for the communication mode icons 300 and 310 contain additional information relating to the communication modes—each mode associated with, for example, a particular network interface, network and/or network provider. In an embodiment of the invention, each communication mode icon, when left clicked using a mouse or other pointing device, identifies at least the network interface technology associated with the selected communication mode icon. Other provided information includes, for example, data rate available, the availability of VPN connections, service provider/carrier/network (when applicable), choice of technology (when multiple network interface technologies fall within a generalized communication mode associated with the communication mode icon), etc. In an embodiment of the invention, the additional information is exposed in the form of a configurable communication mode selection tree (wherein the information at each level of the selection tree is potentially configurable). If only one selection is available at any level of the communication mode selection tree, then that level can be eliminated. Otherwise, the user goes down the tree structure associated with a top-level communication mode type icon and makes selections until a single communication mode is specified. Default selections are maintained at each level such that if a user stops at any point in the selection process, a communication mode selection can still be completed using default selections associated with the remaining levels of the decision tree. The multiple choices under a top-level communication mode selection icon (such as corporate icon 300 or public icon 310) is discussed further herein below with reference to FIG. 4.

Figure 4:
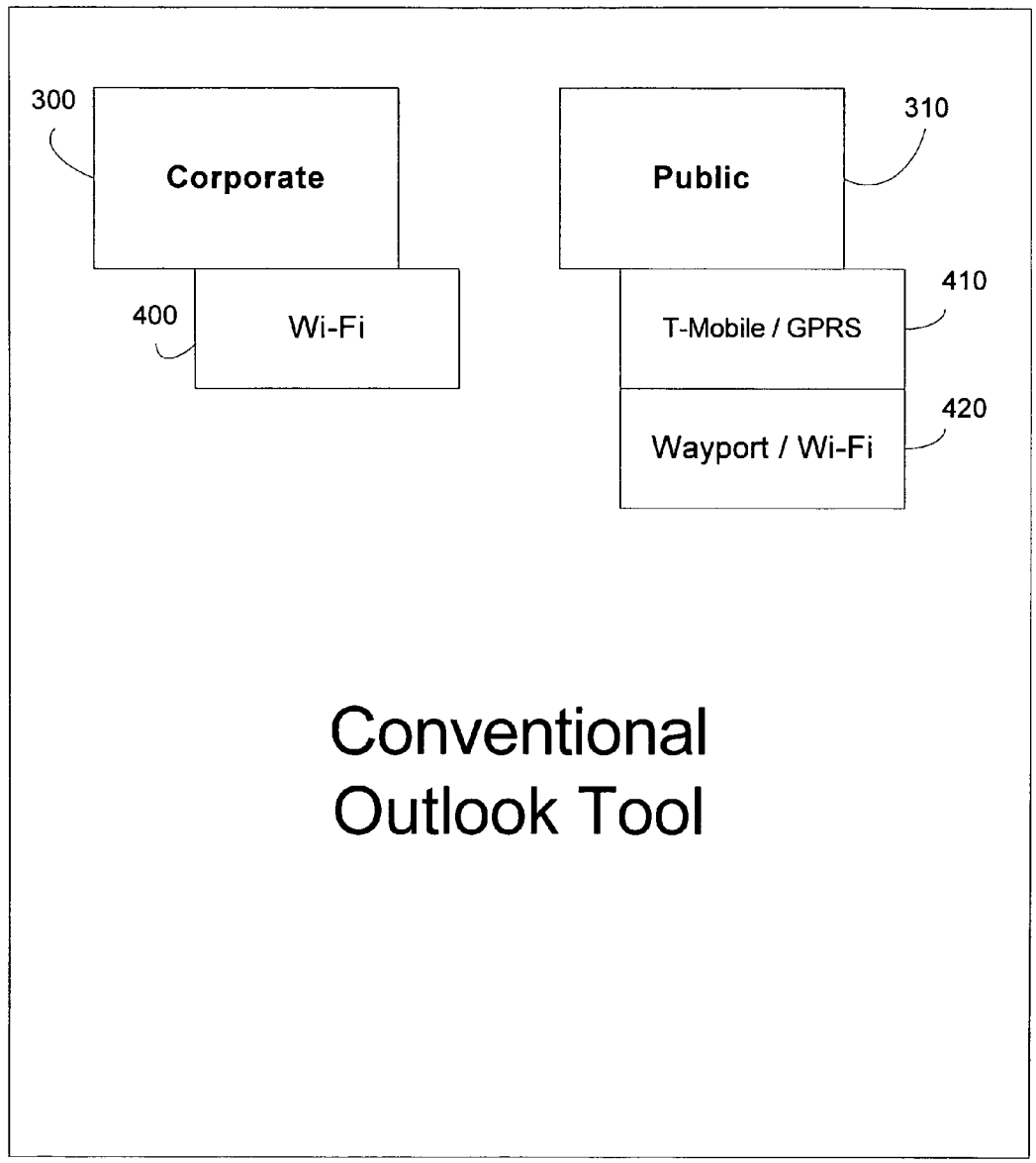
FIG. 4 provides an exemplary application user interface exposing a set of selectable network connections as well as sub-selections corresponding to more particular choices under a general choice of connection type.

Turning to FIG. 4, the user interface for an email application is supplemented to include a set of sub-icons associated with various, more specific, communication mode definitions available under general/partial communication mode selection icons discussed herein above with reference to FIG. 3. In the illustrative example, the corporate connection type icon 300 is associated with a set of corporate connection sub-icons. In the particular example, only a single Wi-Fi connection sub-icon 400 is presented. Therefore, when the corporate connection type icon 300 is selected, email communications will be carried out using Wi-Fi network technology supported by the corporate network. Under the public connection type icon 310, a set of sub-icons identify a number of network service providers and/or networks (as opposed to the wireless technology associated with connection). The set of public connection type sub-icons includes a T-mobile service for GPRS icon 410 and a Wayport service for Wi-Fi icon 420. Thus, a user is capable of selecting one of two available communication modes supported by public networks. Though not depicted, the Wayport Wi-Fi icon 420 potentially includes a set of sub-icons for supported 802.11a and 802.11b protocols. It is again noted that the icons can provide descriptive terms rather than technical terms. In the case of a choice between 802.11a and 802.11b connection types, the corresponding sub-icons, under the Wi-Fi icon 420, are potentially labeled "faster" and "slower" to reflect either actual or potential bandwidths of each communication mode.

Figure 5:
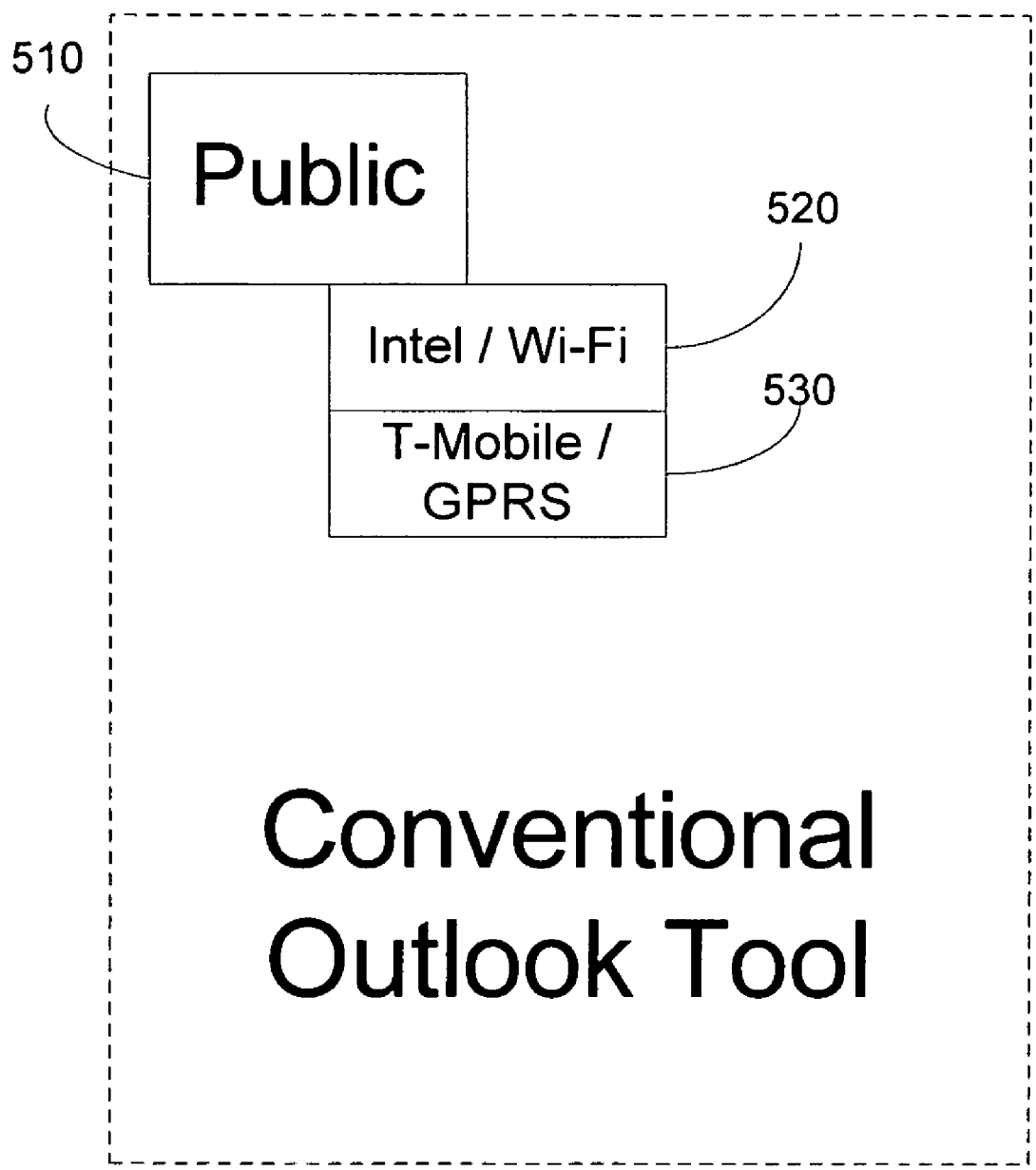
FIG. 5 provides an exemplary application user interface for a mobile computer user scenario.

Turning to FIG. 5 yet another exemplary interface identifies potential choices available to a traveling business person, engineer, etc. In this case, no corporate network communication modes are presently available. Instead, multiple communication modes are presented under the public connection type icon 510. In the illustrative example, an Intel/Wi-Fi connection type icon 520 indicates guest access provided by Intel. A public T-Mobile/GPRS connection type icon 530 offers an alternative for a visitor that seeks to avoid transmitting sensitive information through a customer's (e.g., Intel's) network infrastructure (see, Scenario #2 above).

Figure 6:
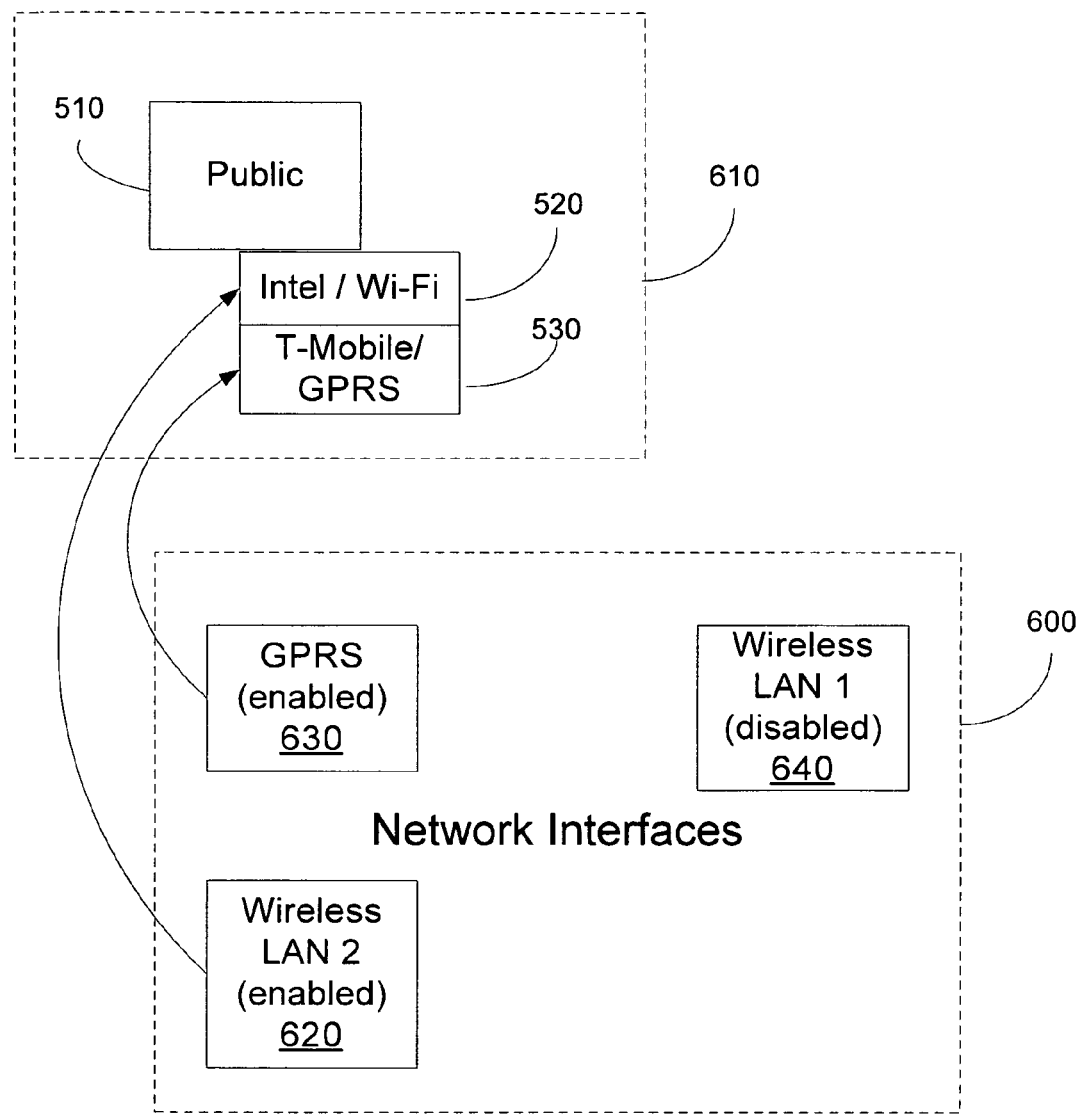
FIG. 6 depicts interface relations established between application-specific connection icons and corresponding enabled network connections.
Figure 7:
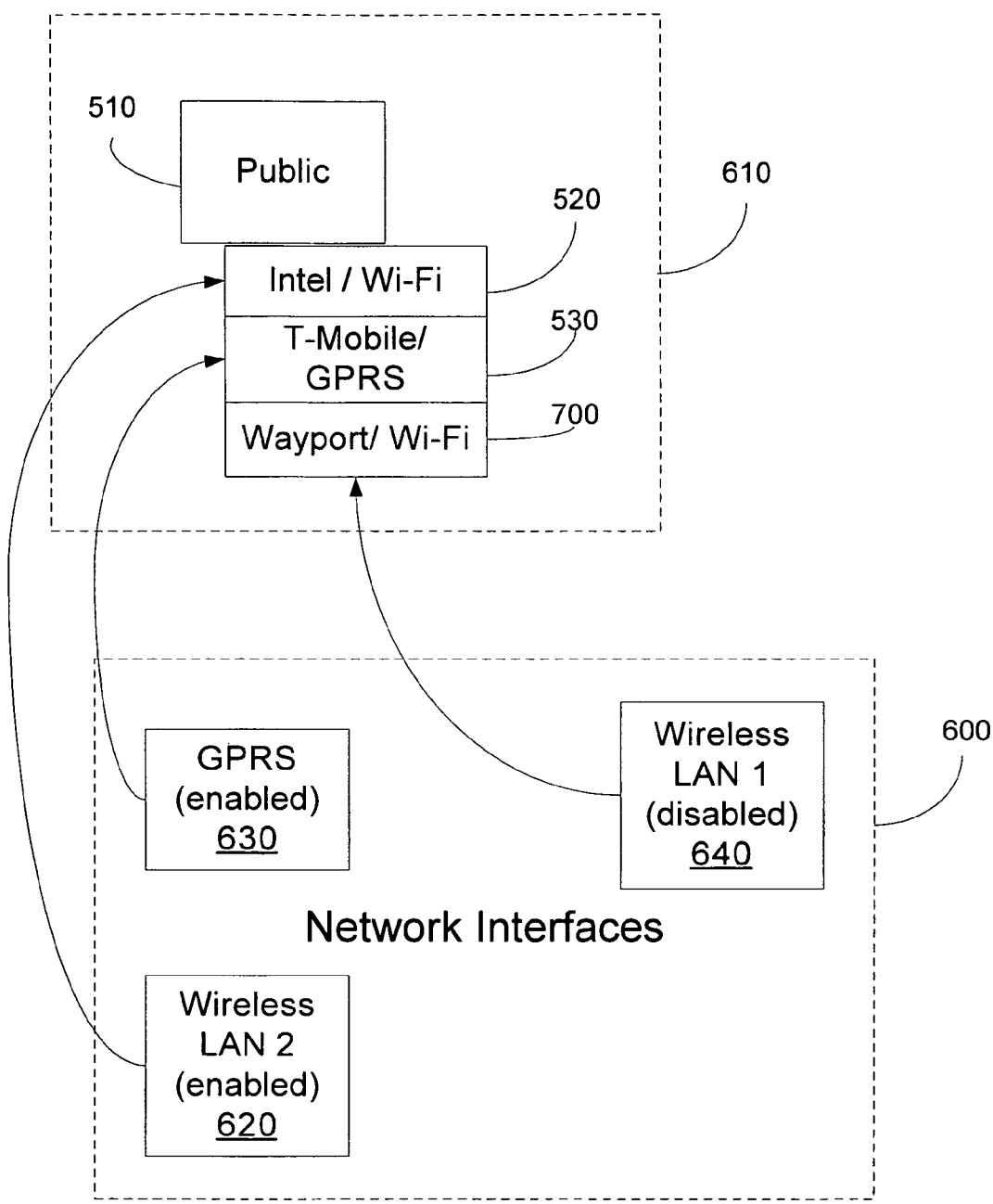
FIG. 7 depicts interface relations established between application-specific connection icons and a set of corresponding enabled and disabled network connections.

Having described exemplary user interfaces associated with the present invention, attention is directed to FIGS. 6 and 7 that present exemplary communication mode icon display schemes. In the illustrative examples, an application user interface displays icons in accordance with the availability of associated communication modes. Furthermore, FIGS. 6 and 7 depict internal linkages/mappings between the displayed communication mode selection icons and underlying available networks (identified in FIGS. 6 and 7 as Network Connections). In general, an application (e.g., MICROSOFT OUTLOOK client) 610 generates icons representative of communication modes supported by the application. More particularly, in an embodiment of the present invention the application displays icons in accordance with communication modes currently supported by an interface between network interfaces 600 (maintained by the operating system) and the corresponding application client 610. In accordance with various embodiments of the invention, two of which are presented in FIGS. 6 and 7, the icons represent communication modes for which: actual connections have been established, connections can be established by selecting the icon, and a connection is supported but currently not available.

In the interface configuration scheme depicted in FIG. 6, icons (or any appropriate indicia) are only displayed for enabled communications modes (e.g., networks available for utilization by the application client 610). The mapping depicted by the arrows between the network interfaces 600 and the application client 610 in FIG. 6 corresponds to interfaces established between: an enabled wireless LAN 2 network interface 620 and structure(s) maintained by the email application corresponding to the Intel/Wi-Fi connection icon 520, and an enabled GPRS network interface 630 and the T-Mobile/GPRS connection icon 530. A Wireless LAN 1 network interface 640 is disabled (e.g., a connection cannot currently be established for the client 610 to the Wireless LAN 1 network), and therefore, in this illustrative embodiment a corresponding communication mode selection icon is not presented in the user interface provided by the email application. However, in the event that a Wireless LAN 1 network interface 640 becomes available (enabled) for the application client 610, a corresponding icon is generated and displayed by the client application 610.

Alternatively, as depicted in FIG. 7, the application client 610 displays communication mode icons and maintains corresponding interfaces between the icons and network interfaces without regard to an enablement state of a corresponding communication mode/network interface. Furthermore, an application may establish a binding with a network (as depicted by the arrow between the application 610 and the network interfaces 600) before or after the user selects the network. Thus, even in the case of an enabled network interface/connection, the application waits until a user selects a particular communication mode (associated with an enabled network interface/connection) before binding to the network interface/connection. Alternatively, the application binds to each enabled network interface/connection without regard to whether a user has selected a corresponding communication mode presented by the application client 610 user interface. In the case where the application only binds to networks corresponding to selected communication modes, in response to selection of a particular presented communication mode, the application invokes network interface setup operations to establish a connection via the interface and bind the application, at least temporarily, to a corresponding one of the network interfaces 600.

In the example provided in FIG. 7, the application client 610 maintains an interface, connection structure and a Wayport/Wi-Fi interface selection icon 700 for the (disabled) Wireless LAN 1 network interface 640. In this embodiment, the network interface icons are, for example, color coded such that an enabled default network interface is green, an enabled non-default network interface is blue, and a disabled network interface is red. In an embodiment of the invention, a user enables a disabled network interface by selecting the icon with a right click of a mouse (or other pointing device) to launch a menu including an enable/disable menu option. The application client 610 makes the appropriate calls to the Wireless LAN 1 network interface 640 via the established interface.

As an extension to the above-described communication mode selection mechanism provided through an application user interface, the application user interface also facilitates users selecting/setting particular attributes for a link implementing a selected communication mode. For example, a user of the email application described above changes security settings for an email message to differ from previously specified values. For instance, the default security setting for all email communications for a user's session are "in the clear" for anyone to read. However, the user selects an "encrypted" option in a context menu presented, for example, by the email application in response to the user right clicking a mouse on a selected communication mode. Thereafter one or more messages whose contents need to be hidden are transmitted in encrypted form by the email application to the email server.

Such a capability supports fine-grained control of communication characteristics that enable a user to tune traffic characteristics based on different concerns/considerations on a transaction-by-transaction basis.

The present invention is applicable to a variety of alternative applications. One such alternative is Internet browser applications such as MICROSOFT INTERNET EXPLORER (IE). In an exemplary browser application the IE will expose communication mode icons on an opening page similar to the ones described above with reference to an email application. The IE application will establish interfaces with potentially available network communication modes in a manner analogous to the interfaces mentioned above with reference to FIGS. 6 and 7 that facilitate establishing a path for network requests and corresponding responses that pass between the IE application and network interfaces maintained by the computing device.

In an exemplary usage scenario a user enters a URL of interest (e.g., www.hotmail.com), and before sending the request, the user selects one of multiple connection icons (e.g., the public connection icon 310) for carrying out the request. Indicia, such as color coding, are used to indicate a currently established or default communication mode established within at least the context of the browser application, that will be used in the event that the user does not designate a different communication mode from the set of connection icons. As discussed above, personal browsing in a corporate environment is potentially carried out via public networks thereby by-passing a company's network resources. In yet another scenario, a business traveler working in a hotel room connects to a corporate server via a virtual private network connection to a corporate network. However, at the same time, the traveler uses instant messaging to communicate with family members over a public network to avoid using the corporate resources for personal use.

In the exemplary IE browser application interface example, default communication modes are utilized unless otherwise overridden by a communication mode selected by a user. Selecting an Enter button on a keyboard on a computing device, without first selecting a non-default communication mode icon, results in selecting the default connectivity for the browser application. However, the user easily changes the default connectivity within the browser application by either right selecting a communication mode icon and choosing/checking a "default" menu option (to toggle the status of the connection icon), or selecting the following progression of menu choices provided by, for example, the IE browser: Tools→Internet Options→Connections (a.k.a. communication modes)→Settings to set the default connectivity for a particular selected connection. In any event, the selection of a communication mode is performed within the application user interface as opposed to accessing a separate operating connection manager utility. In embodiments of the communication mode selection mechanisms disclosed herein, a communication mode selection is made in the context of a logged on user. Furthermore, in an embodiments of the invention, the application itself (transparently to the user of the application) utilizes program interface functionality exposed by a connection manager utility of a computing device to bind a network, corresponding to a selected communication mode, to the application.

In addition to email and browser applications, other examples of appropriate applications include, without limitation, any applications where the preferred type of connection potentially differs between sessions and transactions based upon various considerations including: security, privacy, cost, company policies, congestion, etc.

The above examples have primarily addressed wireless communication modes. However, the present invention contemplates supporting both wired and wireless technologies to carry out a set of communication modes designated via an application. Examples of wireless technologies potentially selected through an application interface include: 802.11a/b/g, GSM/GPRS, CDMA 2000, WCDMA, 802.16, Bluetooth, and ultra wideband (UWB). Potentially selected wired communication modes are carried out via a variety of media including, for example, twisted pair, coaxial cable, and optic fiber. The technology used to carry out wired modes comprises, by way of example, Ethernet, Token-ring, etc.

A variety of connection setup mechanisms/protocols are contemplated for use by applications for establishing network connections involving both wired and wireless technologies. In the case of a wireless communication modes, a dynamic host configuration protocol (DHCP) module, interposed between an application (e.g., email, Internet browser) and a transport layer module (implementing, for example the TCP/IP functionality within a computing machine), may be utilized to configure a machine with an IP address, subnet mask, address of default router, address of other resources, static routes, etc. Once configured the machine can either send the packets directly onto the attached network or establish a VPN connection using PPTP, L2TP, IPSEC tunnel, IP in IP tunnel, etc. Instead of DHCP, static configuration provided by the user or by some other means may also be used. Other well known configuration setup mechanisms embody a variety of protocols including point-to-point protocol (PPP)—for dialup connections and for VPNs such as in point-to-point tunneling protocol (PPTP), layer 2 tunneling protocol (L2TP) may be used. The direct attachment or attachment through a VPN can be shown as different networks or "network interfaces" to the user.

Figure 8:
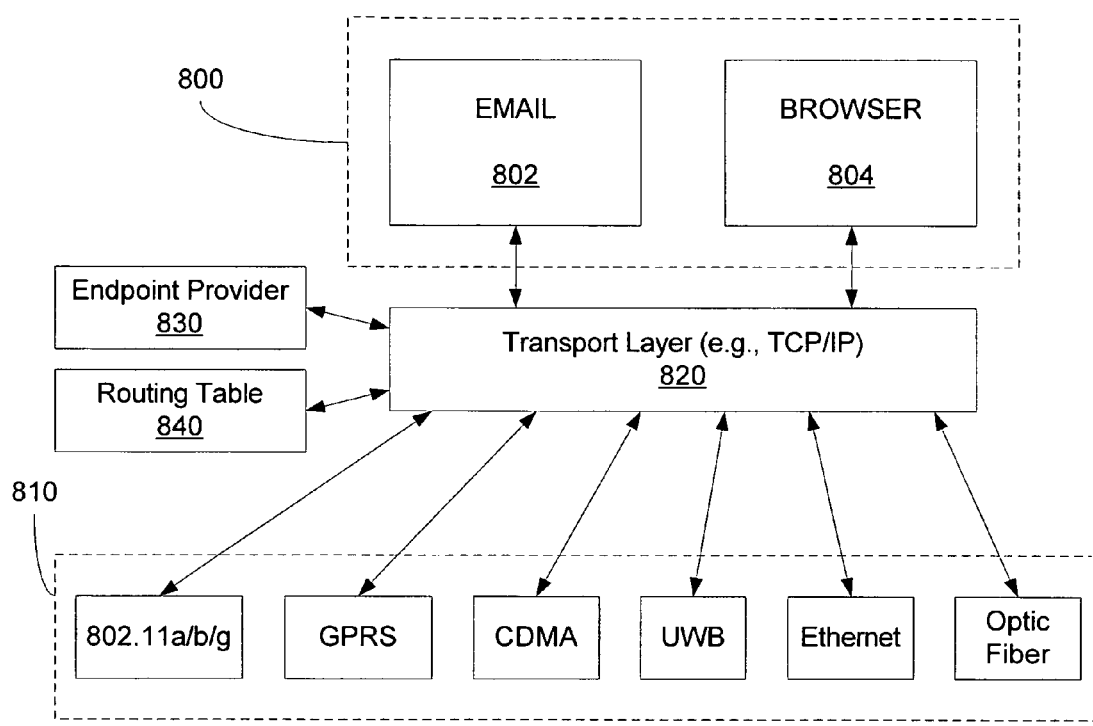
FIG. 8 schematically depicts an exemplary arrangement of computer system components for carrying out the present invention.

Turning to FIG. 8, an exemplary computer system architecture is schematically depicted for carrying out the present invention. In the exemplary embodiment application instances 800, including an email application 802 and a browser application 804, expose the above-described network interface selection user interfaces enabling a user to select a particular network interface from a set of supported network interfaces 810 on a computing device. Examples of such network interface technologies embodied by the network interfaces include: Wi-Fi (e.g., 802.11a/b/g), GPRS, CDMA, UWB, Wired Ethernet, and optic fiber.

The application instances 800 set up connections supporting a variety of network connections carried out by specified ones of the network interfaces 810 through calls to a transport layer component 820. In the exemplary embodiment the transport layer component 820 embodies the TCP/IP rules and operations for setting up and maintaining network connections. While not specifically depicted in FIG. 8, the transport layer component 820 communicates with drivers associated with the network interfaces 810 via a Network Driver Interface Specification (NDIS) component of MICROSOFT's WINDOWS operating system.

An endpoint provider 830 sets up an endpoint for a connection requested by one of the application instances 800 through the transport layer component 820. The transport layer component 820 sets up and maintains a routing table 840. Entries within the routing table 840, binding endpoints and associated network interfaces are created and stored by the transport layer component 820 based upon a requested network interface and endpoint associated with a connection request issued by the application instances 800 to the transport layer component 820.

Figure 9:
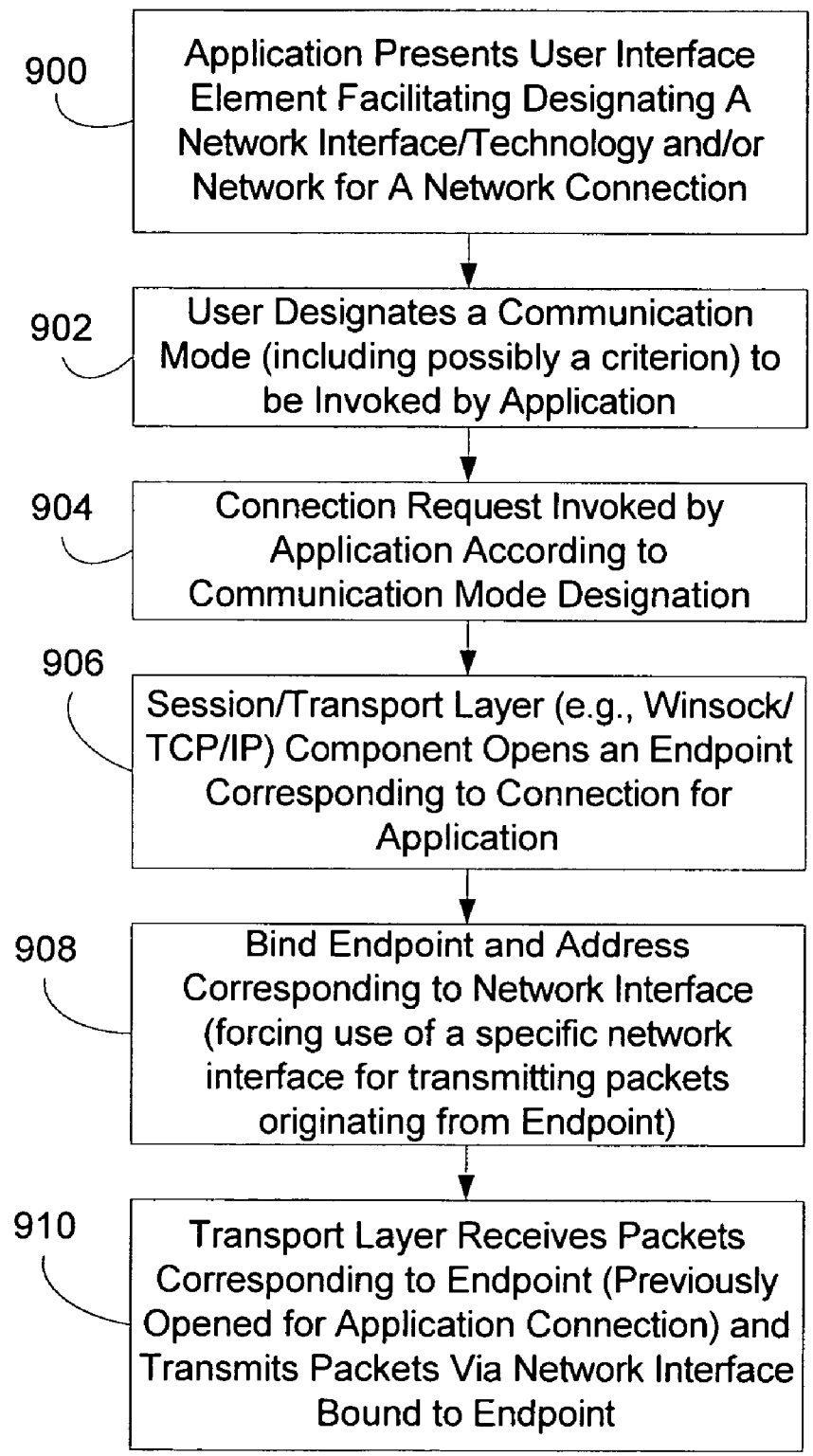
FIG. 9 summarizes a set of steps performed to establish and utilize a connection in accordance with a connection type selection rendered via an application user interface.

Turning to FIG. 9, a sequence of steps/stages summarize a method, performed by a computer system incorporating the exemplary networking architecture depicted in FIG. 8, for carrying out designating/creating a network connection through an application user interface. Initially, at step 900, the application presents a user interface element, such as an icon, that enables a user to designate a particular communication mode. As described herein above each communication mode is potentially defined by a technology, a network interface (embodying a particular technology), and/or a particular network (in cases, such as wireless cellular networks or Wi-Fi networks, where multiple providers/networks are accessible via a same network interface). As demonstrated above, the communication mode selection user interface can come in a variety of forms including, by way of example: multi-level menus/icons, list boxes, and even multiple selection dialogs for defining a technology, interface, network selection criteria.

In fact, an embodiment of the present invention presents a user selection option enabling a user to instruct a computing device to automatically select a "best" connection type. In such case, when the computing device is called upon to designate/establish a network connection for handling network requests by the application, the computing device applies a set of sensed operational/environmental parameter values to an automatic selection criterion.

Furthermore, as explained above, the selection user interface potentially presents connection characteristics (e.g., private/public, fast/slow, secure/non-secure)—that are more likely to have meaning to a user—rather than technical descriptions (e.g., network protocol names) that are not well known to casual users. Thus, step 900 contemplates a broad variety of ways for an application to present network interface/technology and even network and/or network service provider options that are subsequently used to configure a connection for carrying out network communications on behalf of the application. In an embodiment of the present invention, an application supports multiple ways for a user to select a network connection type. At step 902 a user designates a communication mode based upon the options presented by the application during step 900.

Thereafter, during step 904 a connection request is invoked by the application in accordance with the communication mode designated (specifically, by characteristic, by criterion, etc.) during step 902. Such invocation can occur in a variety of ways. For example, the application commences setting up the connection in response to a user selecting an icon, sub-icon, list element, etc. and thereby designating a communication mode to carry out a pending transaction, commence an on-line session, etc. In other instances, the selection process occurs independently with regard to a triggering event (e.g., a user selecting a "send" option on an email application that is currently operating off-line) that invokes creation of a connection of a particular type embodying the previous user designation at step 902.

At step 906, in association with other well known connection setup operations, a transport layer component opens an endpoint corresponding to a connection established on behalf of the application. The endpoint is established, in a particular embodiment of the invention, by a call to the WINSOCK component of MICROSOFT's WINDOWS operating system or alternatively an API in a library that calls WINSOCK or an alternative WINDOWS network interface API. The endpoint identifies communications associated with the particular connection requested by the application during step 904. Thus, each request to transmit a packet originating from the application on the particular connection will include the endpoint identification established during step 906.

Applications have the ability to designate binding and endpoint to "any" interface. However, in such instances the transport layer is able to direct packets to any of the available network interfaces capable of passing the packets to an identified destination address. This is referred to as a weak host model. However, an embodiment of the present invention incorporates a strong host model wherein a transport layer is forced to adhere to an application's request for packets to be routed through an address, bound to an endpoint opened by the application, associated with a particular network interface. Therefore, in accordance with the strong host model, at step 908 the application binds the endpoint opened during step 906 to a network address corresponding to a particular network interface.

Thereafter, at step 910 the transport layer component receives packets from the application and passes the packets onto a network interface corresponding to an address bound to the application's endpoint. In an embodiment of the invention, the transport layer component looks up the endpoint specified in the packet to determine the corresponding network interface address to which the endpoint is bound. The transport layer then passes a packet, augmented with the appropriate network interface address to media access layer drivers for further processing and transmission of the packet via the appropriate network interface and network.

In accordance with an embodiment of the present invention, because the application explicitly binds an endpoint to a particular address, the application is capable of maintaining one or more connections involving any available network interfaces for any desired duration. A user, through a variety of user interface elements described by way of several examples provided herein above, controls the application's selection, creation and destruction of connections. The user, through the application, is thus capable of directing communications to a particular network interface for a variety of durations including: an application instance's existence, a session, a single transaction, message, and in the extreme case, even a single packet transfer.

It will be appreciated by those skilled in the art that a new and useful mechanism and method for selecting/configuring a communication mode via an application user interface have been described herein. More particularly, the selection mechanism and method described herein facilitate user-designated selection of a communication mode (e.g., a network interface/network combination) for accessing a network resource through an application interface (e.g., a menu, a set of icons, etc.) on a per session, transaction, application instance, etc. basis. In embodiments of the invention, communication mode designations are potentially maintained within the context of the application through/for which a communication mode was designated, such that two applications can operate concurrently using different interfaces and/or networks to support network communications. However, as described previously above, in other embodiments, communication mode designations persist across any applications executing within a (logged-on) user context.

In view of the many possible computing environments to which the principles of this invention may be applied and the flexibility of carrying out automated network access configuration to address interference and any other coexistence issues that arise when wireless data communication is contemplated, it should be recognized that the embodiment described herein is meant to be illustrative and should not be taken as limiting the scope of invention. Those skilled in the art to which the present invention applies will appreciate that the illustrative embodiment can be modified in arrangement and detail without departing from the spirit of the invention. Therefore, the invention as described herein contemplates all such embodiments as may come within the scope of the following claims and equivalents thereof.

What is claimed is:

1. A computer-readable storage medium encoded with computer-readable instructions executable upon a computing device capable of supporting network communications via multiple differing communication modes, comprising an application program comprising:
    a set of user interface elements facilitating designating a communication mode through which communications originating from the application program pass; and
    an interface to a transport layer component for:
        initiating binding a network interface to an endpoint opened by the application program in accordance with the designation of the communication mode, the binding being accomplished using a strong host model, the strong host model forcing the transport layer to route transmission requests through the network interface; and
        passing transmission requests to the network interface identifying the endpoint and thereby forcing use of the network interface to complete the transmission requests,
    wherein binding the network interface using the strong host model comprises restricting communications with the endpoint to only be routed through the transport layer and the network interface for a designated period,
    wherein the endpoint corresponds to a connection established on behalf of the application program and identifies communications associated with the connection,
    wherein initiating binding comprises creating a routing table entry, corresponding to the connection, identifying the endpoint and a network address corresponding to the network interface, and
    wherein passing transmission requests to the network interface identifying the endpoint comprises:
        receiving, by the transport layer component, a transmission request from the application program identifying the endpoint;
        determining, by referencing the routing table entry, the network interface corresponding to the network address bound to the endpoint; and
        passing the transmission request onto the network interface in accordance with the determining.

2. The application program of claim 1 wherein the application program supports email functionality.

3. The application program of claim 1 wherein the application program supports browser functionality.

4. The application program of claim 1 wherein the designated period persists for a transaction.

5. The application program of claim 1 wherein the designated period persists for a session.

6. The application program of claim 1 wherein the designated period persists for a duration of an instance of the application program.

7. The application program of claim 1 wherein the designation persists until a new designated period is provided.

8. The application program of claim 1 wherein the set of user interface elements comprise icons corresponding to types of network interfaces, the icons being color-coded to indicate the designation of the communication mode.

9. The application program of claim 8 wherein the icons present a characteristic, to a user, of the corresponding network interfaces.

10. The application program of claim 1 wherein the set of user interface elements comprise menus.

11. The application program of claim 1 wherein the set of user interface elements comprise list boxes.

12. The application program of claim 1 wherein the set of user interface elements comprise icons corresponding to particular communication modes.

13. A method for establishing a network connection through an application user interface presented by an application program executing upon a computing device capable of supporting network communications via multiple differing communication modes, the method comprising:
    presenting, via the user interface, a set of user interface elements facilitating a designation of a communication mode through which communications originating from the application program pass, the presenting comprising selecting a visual appearance of at least one icon to indicate the designation of the communication mode, the visual appearance being associated with a color;
    registering the designation of the communication mode;
    with a transport layer, opening an endpoint corresponding to a connection established on behalf of the application program, wherein the endpoint identifies communications associated with the connection;
    initiating binding the endpoint opened by the application program to a network address corresponding to a network interface of the computing device in accordance with the designation of the communication mode, the endpoint identifying transmission requests from the application program as originating from the application program;
    with the transport layer, receiving transmission requests identifying the endpoint; and
    with the transport layer, passing the transmission requests identifying the endpoint to the network interface and thereby forcing use of the network interface to complete the transmission requests,
    wherein binding the endpoint comprises restricting, for a designated period, the transport layer to route the transmission requests identifying the endpoint only through the network interface and the network address bound to the endpoint,
    wherein binding the endpoint comprises creating a routing table entry, corresponding to the connection, identifying the endpoint and the network address corresponding to the network interface,
    wherein passing the transmission requests comprises:
        receiving a packet from the application program identifying the endpoint;
        determining, by referencing the routing table entry, the network interface corresponding to the network address bound to the endpoint; and
        passing the packets onto the network interface in accordance with the determining.

14. The method of claim 13 wherein the application program supports email functionality.

15. The method of claim 13 wherein the application program supports browser functionality.

16. The method of claim 13 wherein the designated period persists for a transaction.

17. The method of claim 13 wherein the designated period persists for a session.

18. The method of claim 13 wherein the designated period persists for a duration of an instance of the application program.

19. The method of claim 13 wherein the designated period persists until a new designation is provided.

20. The method of claim 13 wherein the at least one icon has a color corresponding to a type of network interface.

21. The method of claim 20 wherein the at least one icon presents a characteristic, to a user, of the corresponding network interfaces.

22. The method of claim 13 wherein the set of user interface elements comprise menus.

23. The method of claim 13 wherein the set of user interface elements comprise list boxes.

24. The method of claim 13 wherein the set of user interface elements comprise the at least one icon corresponding to particular communication modes.

25. A computer-readable storage medium including computer-executable instructions for establishing network connections through a management unit user interface executing upon a computing device capable of supporting network communications via multiple differing communication modes, the computer-executable instructions facilitating performing the steps of:

presenting, via the user interface, a plurality of host models for communicating with a first endpoint opened by a first application, the first endpoint corresponding to a connection established on behalf of the first application, wherein the first endpoint identifies communications associated with the connection;

selecting a strong host model from the plurality of host models;

presenting, via the user interface, a first set of user interface elements corresponding to application programs executable on the computing device;

presenting, via the user interface, a second set of user interface elements facilitating a first designation of a communication mode through which communications originating for a first connection from the first application of the application programs pass;

registering the first designation of the communication mode;

initiating binding a first network address corresponding to a first network interface to the first endpoint opened by the first application in accordance with the first designation of the communication mode, the first endpoint identifying transmission requests from the first application as originating from the first application, wherein the binding comprises creating a routing table entry, corresponding to the connection, identifying the first endpoint and the fist network address corresponding to the first network interface;

passing the transmission requests via a transport layer to the first network interface identifying the first endpoint, wherein binding the first network address to the first endpoint conforms with the strong host model, the strong host model restricting the transport layer to route the transmission requests only through the first network interface and the first network address bound to the first endpoint for a designated period, the designated period persisting for at least one of a transaction, a session, and an instance of the first application; and initiating binding a second endpoint to a second network address corresponding to a second network interface, different from the first network interface, in accordance with a second designation of the communication mode for a second connection from the first application, wherein passing the transmission requests comprises:

receiving a packet from the application program identifying the endpoint;

determining, by referencing the routing table entry, the network interface corresponding to the network address bound to the endpoint; and passing the packets onto the network interface in accordance with the determining.

26. The computer-readable storage medium of claim 25 wherein the first application supports email functionality.

27. The computer-readable storage medium of claim 25 wherein the first application supports browser functionality.

28. The computer-readable storage medium of claim 25 wherein the designated period persists for a transaction.

29. The computer-readable storage medium of claim 25 wherein the designated period persists for a session.

30. The computer-readable storage medium of claim 25 wherein the designated period persists for a duration of an instance of the first application.

31. The computer-readable storage medium of claim 25 wherein the designation persists until a new designated period is provided.

32. The computer-readable storage medium of claim 25 wherein the second set of user interface elements comprise icons corresponding to types of network interfaces, the icons being color-coded to indicate the designation of the communication mode.

33. The computer-readable storage medium of claim 32 wherein the icons present a characteristic, to a user, of the corresponding network interfaces.

34. The computer-readable storage medium of claim 25 wherein the second set of user interface elements comprise menus.

35. The computer-readable storage medium of claim 25 wherein the second set of user interface elements comprise list boxes.

36. The computer-readable storage medium of claim 25 wherein the second set of user interface elements comprise icons corresponding to particular communication modes.

* * * * *